United States Patent
Kanisawa et al.

(10) Patent No.: US 10,510,052 B2
(45) Date of Patent: Dec. 17, 2019

(54) FEE COLLECTION SYSTEM BY ELECTRONIC MONEY

(75) Inventors: Keina Kanisawa, Minato-ku (JP); Yusuke Kitakaze, Minato-ku (JP); Jiro Hotta, Minato-ku (JP); Masahiko Kami, Minato-ku (JP); Tadanobu Otaki, Minato-ku (JP); Toyofumi Kitano, Minato-ku (JP); Kazutaka Kubota, Minato-ku (JP); Satoshi Ueda, Minato-ku (JP); Hideaki Minoda, Minato-ku (JP)

(73) Assignee: KONAMI DIGITAL ENTERTAINMENT CO. LTD., Tokyo (JP)

( * ) Notice: Subject to any disclaimer, the term of this patent is extended or adjusted under 35 U.S.C. 154(b) by 1376 days.

(21) Appl. No.: 13/884,761

(22) PCT Filed: Nov. 15, 2011

(86) PCT No.: PCT/JP2011/076268
§ 371 (c)(1),
(2), (4) Date: May 10, 2013

(87) PCT Pub. No.: WO2012/067098
PCT Pub. Date: May 24, 2012

(65) Prior Publication Data
US 2013/0238494 A1    Sep. 12, 2013

(30) Foreign Application Priority Data
Nov. 18, 2010 (JP) .................... 2010-257457

(51) Int. Cl.
*G06Q 20/06* (2012.01)
*G06Q 20/00* (2012.01)
*G06Q 30/00* (2012.01)

(52) U.S. Cl.
CPC .......... *G06Q 20/065* (2013.01); *G06Q 20/00* (2013.01); *G06Q 30/00* (2013.01); *A63F 2300/5513* (2013.01)

(58) Field of Classification Search
CPC .. G07F 17/32; G07F 17/3244; G07F 17/3239; G07F 7/0866; G07F 17/3246;
(Continued)

(56) References Cited

U.S. PATENT DOCUMENTS 4,351,028 A * 9/1982 Peddie ................. G01R 21/133
324/116
5,277,424 A * 1/1994 Wilms .................... G07F 17/32
273/274
(Continued)

FOREIGN PATENT DOCUMENTS

GB    2374191       * 9/2002 ............. G07F 17/34
GB    2374191 A   * 9/2002 ............. G07F 17/34
(Continued)

OTHER PUBLICATIONS

Japanese Office Action with English Translation (Dispatch Date—Feb. 26, 2013).
International Search Report (dated Dec. 13, 2011).

*Primary Examiner* — Mohammad Z Shaikh
(74) *Attorney, Agent, or Firm* — Howard & Howard Attorneys PLLC

(57) ABSTRACT

In a fee collection system a game machine as a charge collective apparatus is provided with a reader terminal for obtaining predetermined identification information from a card, and a reader control unit for outputting to a control board a signal equivalent to an output signal of a coin selector, wherein when a card ID is transmitted from the reader control unit, a management PC refers to charge setting data, determines the consumption amount of electronic money, and requests an account management server to (Continued)

process withdrawal of the consumption amount from an account of electronic money corresponding to the card ID. The management PC notifies the reader control unit the processing result transmitted from the account management server, and outputs to the control board a signal equivalent to the output signal of the coin selector when the withdrawal is successful.

7 Claims, 6 Drawing Sheets

(58) Field of Classification Search
CPC ...... G06Q 20/18; G06Q 20/145; G06Q 40/12; G06Q 20/34; G06Q 20/342; G06Q 20/3676; A63F 2300/5513
See application file for complete search history.

(56) References Cited

U.S. PATENT DOCUMENTS

| | | | | |
|---|---|---|---|---|
| 5,429,361 A * | 7/1995 | Raven | G07F 9/08 | 463/25 |
| 5,470,079 A * | 11/1995 | LeStrange | G07C 15/005 | 463/25 |
| 5,575,374 A * | 11/1996 | Orus | G07F 1/06 | 194/213 |
| 5,811,772 A * | 9/1998 | Lucero | G06Q 20/04 | 235/380 |
| 6,019,283 A * | 2/2000 | Lucero | G06Q 20/04 | 235/380 |
| 6,254,483 B1 * | 7/2001 | Acres | G07F 17/32 | 463/23 |
| 6,296,101 B1 * | 10/2001 | Hasegawa | G07F 5/18 | 194/217 |
| 6,511,377 B1 * | 1/2003 | Weiss | G07F 17/32 | 463/25 |
| 6,515,535 B2 * | 2/2003 | Myono | H02M 3/073 | 327/536 |
| 6,616,535 B1 * | 9/2003 | Nishizaki | G07F 17/32 | 235/380 |
| 6,997,807 B2 * | 2/2006 | Weiss | G07F 17/32 | 463/20 |
| 7,362,862 B2 * | 4/2008 | Schneier | A63F 13/12 | 380/251 |
| 7,390,263 B1 * | 6/2008 | Acres | G07F 17/32 | 463/27 |
| 7,950,998 B2 * | 5/2011 | Ueda | G06Q 30/04 | 463/25 |
| 8,133,112 B2 * | 3/2012 | Walker | G07F 17/32 | 463/20 |
| 8,206,210 B2 * | 6/2012 | Walker | G07F 17/32 | 463/20 |
| 8,452,687 B2 * | 5/2013 | Rowe | G06Q 20/10 | 705/35 |
| 8,795,051 B2 * | 8/2014 | Muir | G07F 17/32 | 463/16 |
| 8,905,848 B2 * | 12/2014 | Umaki | A63F 13/49 | 463/24 |
| 8,974,291 B2 * | 3/2015 | Weiss | G07F 17/32 | 463/25 |
| 9,489,800 B2 * | 11/2016 | Walker | G07F 17/32 | |
| 10,013,687 B2 * | 7/2018 | Kanisawa | G06Q 20/105 | |
| 2002/0025850 A1 * | 2/2002 | Hafezi | G07F 17/3202 | 463/29 |
| 2002/0035552 A1 * | 3/2002 | Tsubura | G06Q 20/06 | 705/412 |
| 2002/0039921 A1 * | 4/2002 | Rowe | G06Q 20/06 | 463/25 |
| 2002/0103030 A1 * | 8/2002 | Muramatsu | G07F 17/32 | 463/42 |
| 2002/0145542 A1 * | 10/2002 | Yamashita | G07B 15/063 | 340/935 |
| 2003/0004871 A1 * | 1/2003 | Rowe | G06Q 20/10 | 705/39 |
| 2003/0040356 A1 * | 2/2003 | Gauselmann | G07F 7/02 | 463/20 |
| 2003/0211889 A1 * | 11/2003 | Walker | A63F 3/081 | 463/42 |
| 2004/0072617 A1 * | 4/2004 | Takahashi | A63F 13/77 | 463/42 |
| 2004/0087360 A1 * | 5/2004 | Chamberlain | G06Q 20/10 | 463/25 |
| 2005/0059457 A1 * | 3/2005 | Rothschild | G07F 17/32 | 463/16 |
| 2005/0187012 A1 * | 8/2005 | Walker | G06Q 50/12 | 463/25 |
| 2006/0040730 A1 * | 2/2006 | Walker | G07F 17/32 | 463/20 |
| 2006/0046835 A1 * | 3/2006 | Walker | G07F 17/32 | 463/20 |
| 2006/0068898 A1 * | 3/2006 | Maya | G07F 17/32 | 463/25 |
| 2006/0166736 A1 * | 7/2006 | Sabo | G07F 17/32 | 463/29 |
| 2006/0271423 A1 * | 11/2006 | Hiranoya | G06Q 30/02 | 705/14.26 |
| 2006/0287057 A1 * | 12/2006 | Osawa | G07F 17/32 | 463/19 |
| 2007/0032294 A1 * | 2/2007 | Ueda | G06Q 20/06 | 463/25 |
| 2008/0006649 A1 * | 1/2008 | Masters | G06Q 30/00 | 221/154 |
| 2008/0090657 A1 * | 4/2008 | Miller | A63F 13/08 | 463/31 |
| 2008/0281692 A1 * | 11/2008 | Zhang | G06Q 20/10 | 705/14.16 |
| 2011/0250950 A1 * | 10/2011 | Nonaka | G06Q 20/10 | 463/25 |
| 2012/0021194 A1 * | 1/2012 | Alston | C04B 41/0036 | 428/210 |
| 2012/0042356 A1 * | 2/2012 | Kubota | G05B 15/02 | 726/2 |
| 2012/0047068 A1 * | 2/2012 | Kanisawa | G06Q 20/105 | 705/41 |
| 2012/0208627 A1 * | 8/2012 | Kitakaze | G07F 17/3244 | 463/25 |
| 2013/0132306 A1 * | 5/2013 | Kami | G06Q 30/0283 | 705/400 |
| 2013/0165236 A1 * | 6/2013 | Nagatomo | A63F 9/24 | 463/42 |
| 2013/0184073 A1 * | 7/2013 | Uchiyama | A63F 13/12 | 463/29 |
| 2013/0238494 A1 * | 9/2013 | Kanisawa | G06Q 20/00 | 705/39 |
| 2013/0303272 A1 * | 11/2013 | Otaki | G07F 17/3244 | 463/25 |

FOREIGN PATENT DOCUMENTS

| | | |
|---|---|---|
| JP | 2003-117219 A | 4/2003 |
| JP | 2003-284813 A | 10/2003 |
| JP | 2008-257518 A | 10/2008 |
| JP | 2010-009528 A | 1/2010 |
| WO | 2005/025703 A1 | 3/2005 |

* cited by examiner

| THE NUMBER OF TIMES PLAYED | CONSUMPTION AMOUNT |
|---|---|
| 1 | 150P |
| 2 | 120P |
| 3 | 90P |
| 4≦ | 70P |

FEE COLLECTION SYSTEM BY ELECTRONIC MONEY

CROSS REFERENCE TO RELATED APPLICATION

This application is a national stage application of PCT/JP2011/076268, filed Nov. 15, 2011, which claims priority to Japanese Patent Application No. 2010-257457, filed Nov. 18, 2010, the disclosures of which are hereby incorporated by reference in their entirety.

TECHNICAL FIELD

The present invention relates to a system which is applied to an apparatus to charge such as a game machine and makes it possible to collect a fee using electronic money.

BACKGROUND ART

In recent years, in place of or in addition to the fee collection by physical medium such as cash or substitute coins, a fee collection system capable of collecting a fee by electronic money has been practiced in various kinds field. For example, with respect to a game machine for business use where game-play is available in exchange of collection of a game-play fee, it is conventionally general that a detection means such as a coin-selector detects fee payment by cash (as typical example, coins), a pulse signal is outputted as a payment signal to a control circuit of the game machine, and the control circuit starts processes necessary to play the game upon receiving the payment signal. On the other hand, there is planned or practiced a system in which an additional unit for practicing fee payment by electronic money is made to intervene between the detection means and the control circuit, and when the user has paid a fee by electronic money, a signal equivalent to the payment signal is outputted from the additional unit to the control circuit (for example, refer to the patent literature 1).

Patent Literature PTL1: WO 2005/025703.

SUMMARY OF INVENTION

Technical Problem

The conventional fee collection system is a system that all components thereof are incorporated in the charge objective apparatus, and is merely a system which functions as a substitute means of fee collection by cash. For example, in a case that the system is applied to the game machine for business use, when the payment by electronic money corresponding to a game-play fee required for one time of game-play, the signal equivalent to the payment signal is merely outputted. The detection means for the payment by cash is, because of its mechanistic restriction, or its cost restriction, often set such that the acceptable minimum unit value thereof is bigger than the minimum unit value of circulated money, and the change the minimum unit is not easy. On the other hand, with respect to the fee collection using electronic money, it is possible to set a unit for settlement comparatively free without effect of mechanic or cost restriction, and it is comparatively easy to change the minimum unit. However, aside from such freedom degree for setting a fee, to the conventional fee collection system by electronic money, a controller of game facility (an administrator, or an operator) feels a lack of function for activating the flexibility, and cannot enjoy sufficiently advantages of electronic money.

Then, the present invention aims to provide a fee collection system which is capable of improving the freedom degree and flexibility for setting a fee by activating advantages of collection a fee by electronic money.

Solution to Problem

As one embodiment of the present invention, the present invention is configured as a fee collection system being applied to a charge objective apparatus having: a detection device detecting a payment of a use fee by a user and outputting a predetermined payment signal; and a use control device implementing a predetermined process for use in response to the payment signal outputted, the fee collection system comprising: an information obtaining device adapted and configured to obtain based on an operation by the user information provided by the user for collection of a use fee by electronic money; a charge setting data storage device adapted and configured to store charge setting data where a consumption amount of electronic money necessary for using the charge objective apparatus is recorded; a consumption amount determination device adapted and configured to determine the consumption amount of electronic money referring to the charge setting data; a collection implementation device adapted and configured to implement a process necessary for collection of the consumption amount determined by the consumption amount determination device; an equivalent signal output device adapted and configured to output a payment equivalent signal equivalent to the payment signal in a case that the collection of the consumption amount is successful; and a charge setting data control device adapted and configured to control the charge setting data so that a content of the charge setting data is changed by following a setting operation by a predetermined controller, wherein the information obtaining device and the equivalent signal output device are provided to an apparatus side unit mounted to the charge objective apparatus, the charge setting data control device is provided to a management unit separated from the charge objective apparatus and connected to the apparatus side unit in a state of enabling communications, and each of the charge setting data storage device, the consumption determination device, and the collection implementation device is provided to the apparatus side unit or the management unit. "A controller" mentioned here is a person who can control the management unit for controlling the charge data, and corresponds to, for example, an administrator (or an operator) of a store where the charge objective apparatus is installed.

According to the present invention, when the information provided by a user for collection of an electronic fee is obtained by the information obtaining device, implemented by the collection implementation device is a process necessary for collecting the consumption amount determined based on the charge setting data. When the collection is successful, the equivalent signal is outputted from the equivalent signal output device. By the output, the use control device of the charge objective apparatus implements a predetermined process for use. As the consumption amount as a condition for outputting the equivalent signal is set by the charge setting data, it is not required to match substantially a collection value of a use fee necessary for the detection device to output the payment signal with a consumption amount of electronic money necessary for the equivalent signal output device to output the equivalent signal. In addition, it is possible to change the content of the charge setting data by using the charge setting data control device provided to the management unit which is separated from the charge objective apparatus. Accordingly, with respect to the fee collection by electronic money, it is possible to improve the freedom degree and flexibility of fee setting, and thereby, possible to make the most of the advantageous of electronic money.

The fee collection using electronic money includes a pre-paid type and a post-paid type. In the present invention, the information obtaining device and the collection implementation device may be configured in accordance with each of those types. For example, in a case of the pre-paid type, information necessary for specifying the amount of electronic money available for a user, such as identification information of the user or the available amount of electronic money itself, is set as the information provided by the user, and the collection implementation device accesses directly or indirectly data where recorded is the amount of electronic money possessed by the user in exchange of cash, and subtracts the consumption amount from the amount recorded. In this case, the data where the amount of electronic money is recorded may be held by the management unit or a server connected to the management unit via a network, or recorded in a medium or the like possessed by the user. In addition, in a case of the post-paid type, the identification information of the user is obtained by the information obtaining device, and the collection implementation device is configured so as to notify a system for treating a post-paid process of the user identification information and the consumption amount.

As one embodiment of the present invention, a plurality of consumption amounts may be recorded in such a way that each of the consumption amounts are associated with a condition set in a range of determinable by using the information obtained by the information obtaining device, and the consumption amount determination device may be adapted and configured to determine the consumption amount depending on a determination result of the condition when implementing fee collection by electronic money. Thereby, it is possible to improve the freedom degree and flexibility of the fee setting. As a further embodiment of the present invention, the charge setting data control device may be provided so as to change at lease either one of the condition or the consumption amount. Thereby, it is possible to set detailedly the consumption amount depending on the condition.

To the range of determinable by using the information obtained by the information obtaining device, various kinds of ranges can be applied. For example, in a case that the identification information of the user is obtained as the information provided by the user, it is possible to set a condition such that the use state (the number of times used, the number of repetitions, use time and the like) of the user is determined by using the identification information and the consumption amount is changed depending on the use state. Alternatively, in a case that the available amount of electronic money is obtained as the information provided by the user, it is possible to set the condition such that the consumption amount is changed depending on the available amount.

As one embodiment of the present invention, the management unit may be connected to an account management server via a predetermined network, the account management server may be adapted and configured to hold account data where a balance of electronic money available for the user is recorded, and implement a withdrawal process, in response to a request for withdrawal transmitted from the management unit, the request specifying identification information for specifying the account data and the consumption amount of electronic money, where the account management server attempts a withdrawal of the consumption amount from the account data corresponding to the identification information, and notify the management unit of an attempt result, the information obtaining device may be adapted and configured to obtain the identification information as the information provided by the user, and the collection implementation device may be provided to the management unit, and as the process necessary for collection of electronic money, may be adapted and configured to transmit to the account management server the request for withdrawal specifying the information obtained by the information obtaining device for specifying the account data and the consumption amount determined by the consumption determination device, and provide the equivalent signal output device with the attempt result transmitted from the account management server. According to the present invention, the apparatus side unit and the management unit are provided for one charge objective apparatus. Thereby, it is possible to collect by electronic money the use fee of the charge objective apparatus from the account data held by the account management server. In a case that there already exists a system of fee collection using the account management server, there is an advantage that an existing charge objective apparatus can be incorporated to the system in a comparatively easy way.

In the above embodiment using the account management server, each of a plurality of charge objective apparatuses may be provided with the apparatus side unit, and the management unit may be provided so as to be shared by the apparatus side units in a state that any one of the apparatus side units of the plurality of charge objective apparatuses can be specified as a communication partner. Thereby, the management unit is shared by the plurality of charge objective apparatuses. Because of this, it is possible to reduce the load of costs and facilities necessary for applying the fee collection system of the present system. Additionally, as the charge setting data of each apparatus side unit can be controlled by the management unit shared, it is possible to also reduce the load of the operator.

Further, the charge setting data may be provided for each of the apparatus side units independently, and the charge setting data control device may be adapted and configured to control the charge setting data for each apparatus side unit independently. Thereby, it is possible to set the fee setting freely and flexibly for each charge objective apparatus.

In the present invention, the charge objective apparatus may be various kinds of apparatus. As one example, the charge objective apparatus may be a game machine for business use, and the detection device may be adapted and configured to detect the payment of the use fee by cash, and output the payment signal. Thereby, by adding a system of fee collection by electronic money to a game machine for business use having a system of fee collection by cash, the present invention can take effect.

DESCRIPTION OF EMBODIMENTS

Figure 1:
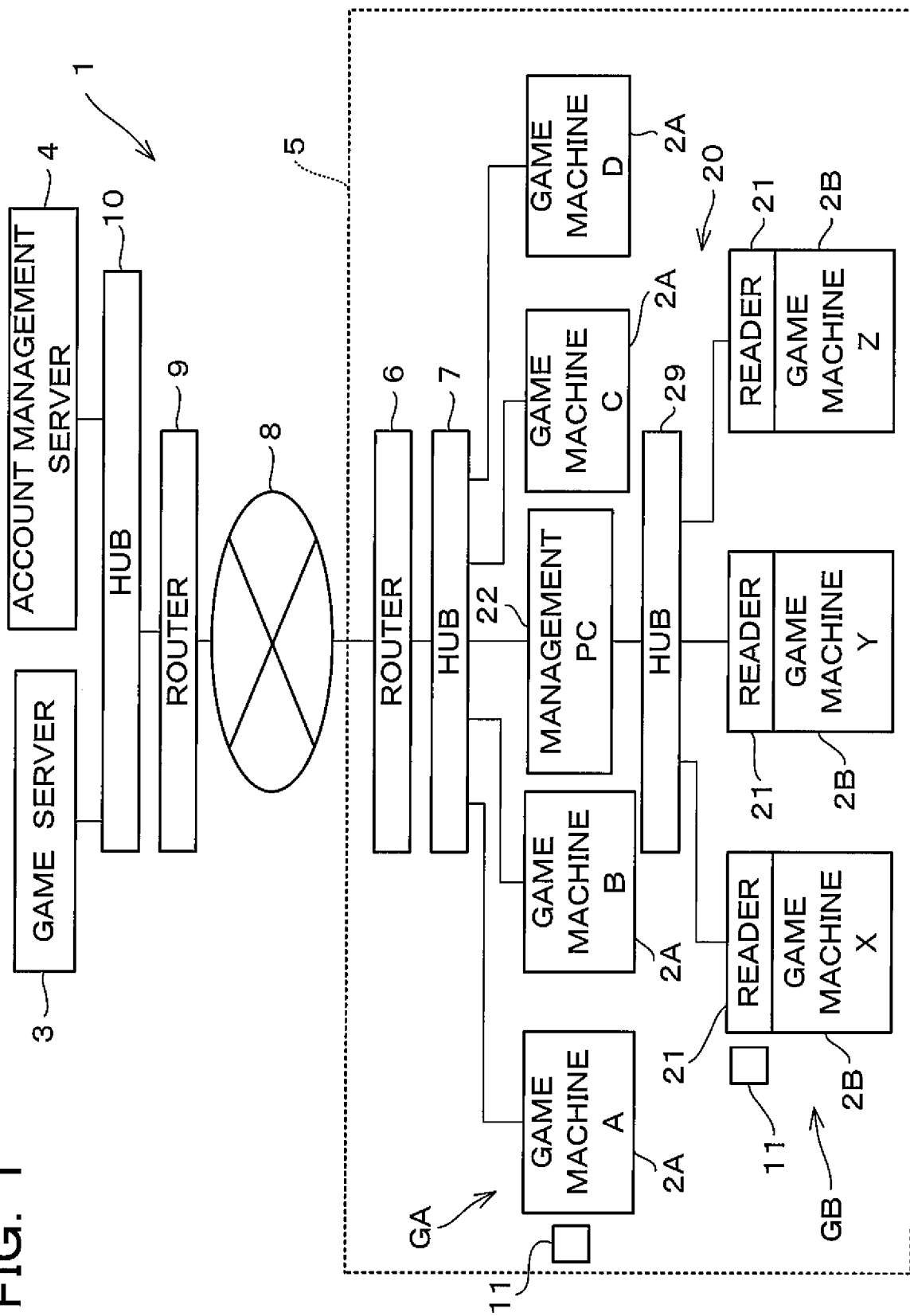
FIG. 1 is a diagram showing a whole configuration of a game system to which a fee collection system according to one embodiment of the present invention is applied.

FIG. 1 shows a whole configuration of a game system to which a fee collection system according to the present invention is applied. First, a game system 1 as a premise will be described. The game system 1 includes a first game machine group GA, a game server 3 and an account management server 4. A plurality of first game machines 2A are included in the first game machine group GA.

Figures 3, 4:
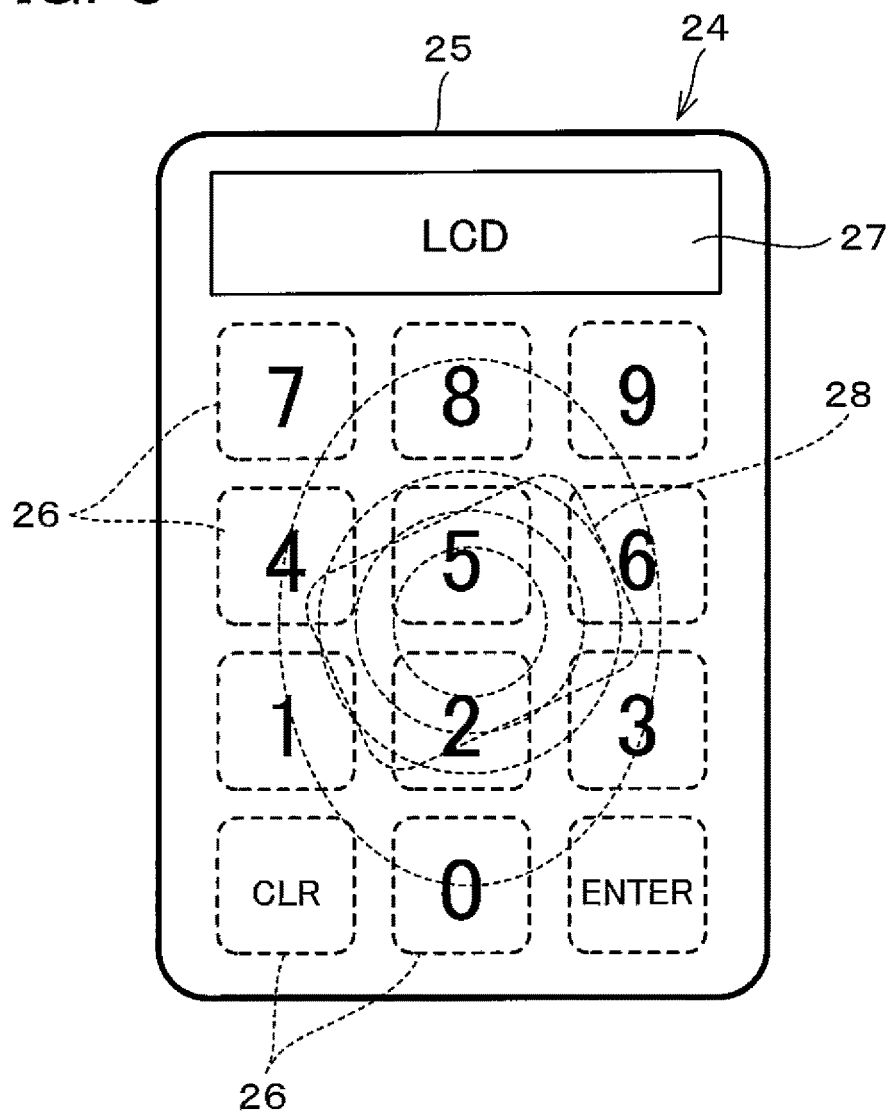
FIG. 3 is a front view of a reader terminal.
FIG. 4 is a diagram showing one example of charge setting data.

The first game machine 2A is configured as a game machine for business use (or commercial use) which charges a game-play fee as a counter value of a game. An appropriate number of first game machines 2A are installed in a commercial facility such as a store 5. Although four of the first game machines 2A (game machines A to D) are shown in FIG. 4, the number may be determined depending on the situation. The first game machine 2A is connected to a router 6 installed in the store 5 via a hub 7, and the router 6 is connected to a network 8. Thereby, the router 6, the hub 7 and the first game machine 2A constitute a part of a store LAN. On the other hand, the game server 3 and the account management server 4 are connected to each other via a router 9 and a hub 10, and the router 9 is connected to the network 8. The network 8 is, for example, the internet. Each of the first games 2A, the server 3, and the server 4 can communicate with each other via the network 8. In a case that the network 8 is the internet, the store LAN is configured as an intranet so that each of the router 6 and the first game machines 2A is distinguished from each other by a local IP address. A global IP address is given to each of the routers 6, 9. In addition, each of the game server 2, the account management server 4, and the router 9 is distinguished from each other by using a local IP address within the same LAN. By using those IP addresses, it is possible to specify unambiguously a communication partner among the servers 3, 4 and the first games 2A.

The game server 3 is capable of providing various kinds of service to the first game machine 2A via the network 8. The first game machine 2A has a function for enjoying the service provided by the game server 3. For example, the game server 3 provides the following services: the service of updating a program or data of a game to be executed at the first game machine 2A; the service of verifying a user (a player) of the first game machine 2A, storing game-play data including the user's game-play history, save data and the like, and providing the first game machine 2A with the game-play data in response to a request from the first game machine 2A; the service of combining users when the users battle or cooperate with each other via the network 8 to progress a game; and the like. In the first game machine 2A, hardware and software necessary to access to the game server 3 and use the services are incorporated.

As one example, the verification of a user of the first game machine 2A is executed using a card 11 given to the user. An IC chip is incorporated in the card 11, and in the IC chip, a card ID unique for each card is recorded. In the first game machine 2A, installed are a card reader (not illustrated) which reads out the card ID from the card 11, and software for requesting a predetermined processing to the game server 3 with specifying the card ID read out by the card reader, and treating a response from the game server 3 to the request. In a case of receiving the request from the first game machine 2A, the game server 3 executes processing so as to store the game-play data in association with the card ID, transmit to the first game machine 2A the game-play data stored in association with the card ID, or combine users by referring to the game-play data correlated with the card ID. The game-play data of the game server 3 may be correlated to the card ID on one-to-one, or may be correlated to the other card ID (a user ID as an example) correlated to the card ID on one-to-one or many-to-one.

The account management server 4 is a server which manages account data of electronic money. The account data is data where the card ID, or the other ID (the user ID as an example) correlated to the card ID on one-to-one or many-to-one, and the balance of electronic money deposited by the user are recorded in association with each other. In a case that the user wants to pay by electronic money a game-play fee for a game of the first game machine 2A, withdrawal is requested from the first game machine 2A to the account management server 4 with specifying the card ID and the consumption amount (the withdrawal value) of electronic money. In response to the request, the account management server 4 specifies the account data of the user, and attempts to withdraw the electronic money corresponding to the consumption amount from the balance of the account data. In a case that the balance indicates the consumption amount or more, the account management server 4 subtracts the consumption amount from the balance and notifies the first game machine 2A that the withdrawal is successful. On the other hand, in a case that the balance indicates less than the consumption amount, without implementing the subtraction, the account management server 4 notifies the first game machine 2A that the withdrawal is unsuccessful. In the first game machine 2A, in response to the notice from the account management server 4, it is controlled whether the game-play is permitted or not. In the first game machine 2A, programs and data necessary for collecting the game-play fee by electronic money in cooperation with the account management server 4 are mounted in advance. The unit of electronic money may be determined depending on the situation. As one example, the unit of electronic money is set so that one JPY as money corresponds to one point of electronic money.

As mentioned above, in the game system 1, it is possible to, by using the card ID recorded in the card 11, enjoy various kinds of service provided by the game server 3 at the first game machine 2A and collect the game-play fee of the first game machine 2A from the account of electronic money managed by the account management server 4. However, in order to use such services, the first game machine 2A is required to have hardware and software for processes of such services. On the other hand, in the store 5, sometimes there is a game machine which was developed not on the premise of using the servers 3, 4. Typically, a game machine which was developed on the premise of operating as a so-called stand-alone corresponds to this type. Alternatively, in a case of a game machine which was developed on the premise of only using the services provided by the game server 3, it is impossible to enjoy the fee collection service by electronic money using the account management server 4. Then, for such game machines, the game system 1 is provided with a fee collection system 20 for adding a fee collection function using the account management server 4. Hereinafter, this system 20 will be described.

In FIG. 1, in the store 5, a second game machine group GB is provided in addition to the first game machine group GA. A plurality of second game machines 2B are included in the second game machine group GB. In FIG. 1, though three of the second game machines 2B (corresponding to the game machines X to Z) are shown, the number of game machines 2B may be determined depending on the situation. The second game machine 2B is configured, like the first game machine 2A, as a game machine for business use (or commercial use) which collects a game-play fee as a counter value of a game. However, while the first game machine 2A has the hardware and software for using the services by the game server 3 and the account management server 4, the second game machine 2B is configured as a so-called stand-alone game machine which has no hardware and software for using the servers 3, 4. The second game machine 2B may be configured so as to make it possible to use at least a part of services by the game server 3. In either case, the second game machine 2B is, at least, configured so as to collect the game-play fee by cash, and does not have a function of collecting the game-play fee by electronic money using the account management server 4. Each second game machine 2B corresponds to the charge objective apparatus of the present invention.

For such second game machine group GB, the fee collection system 20 includes: a reader 21 as an apparatus side unit correlated to each second game machine 2B on one-to-one; and a management personal computer (hereinafter, abbreviately called as a management PC) 22 as a management unit. The reader 21 is connected to the management PC via a hub 29, and the management PC 22 is connected to the router 6 via the hub 7. Thereby, the reader 21, the management PC 22 and the hub 29 are contained in the same store LAN as the game machine 2A and the like. The management PC 22 is provided with a local IP address unique in the store LAN. Thereby, it is possible to specify unambiguously a communication partner between the management PC 22 and the account management server 4. Between the management PC 22 and the reader 21, a communication partner may be specified to each other by giving a local IP address unique in the store LAN to the reader 21, or the reader 21 may be unambiguously specified by the management PC 22 by giving a unique identification number to each reader 21. In either case, the management PC 22 is, at least, configured so as to distinguish each reader 21. Hereinafter, the information for the management PC 22 to distinguish each reader 21 is referred to as a reader ID. In a case that a local ID address is given to each reader 21, the local ID address can be used as the reader ID, or in place of or in addition to the local IP address, a reader number unique for each reader 21 may be given to each reader 21, and the reader number may be used as at least a part of the reader ID.

Figure 2:
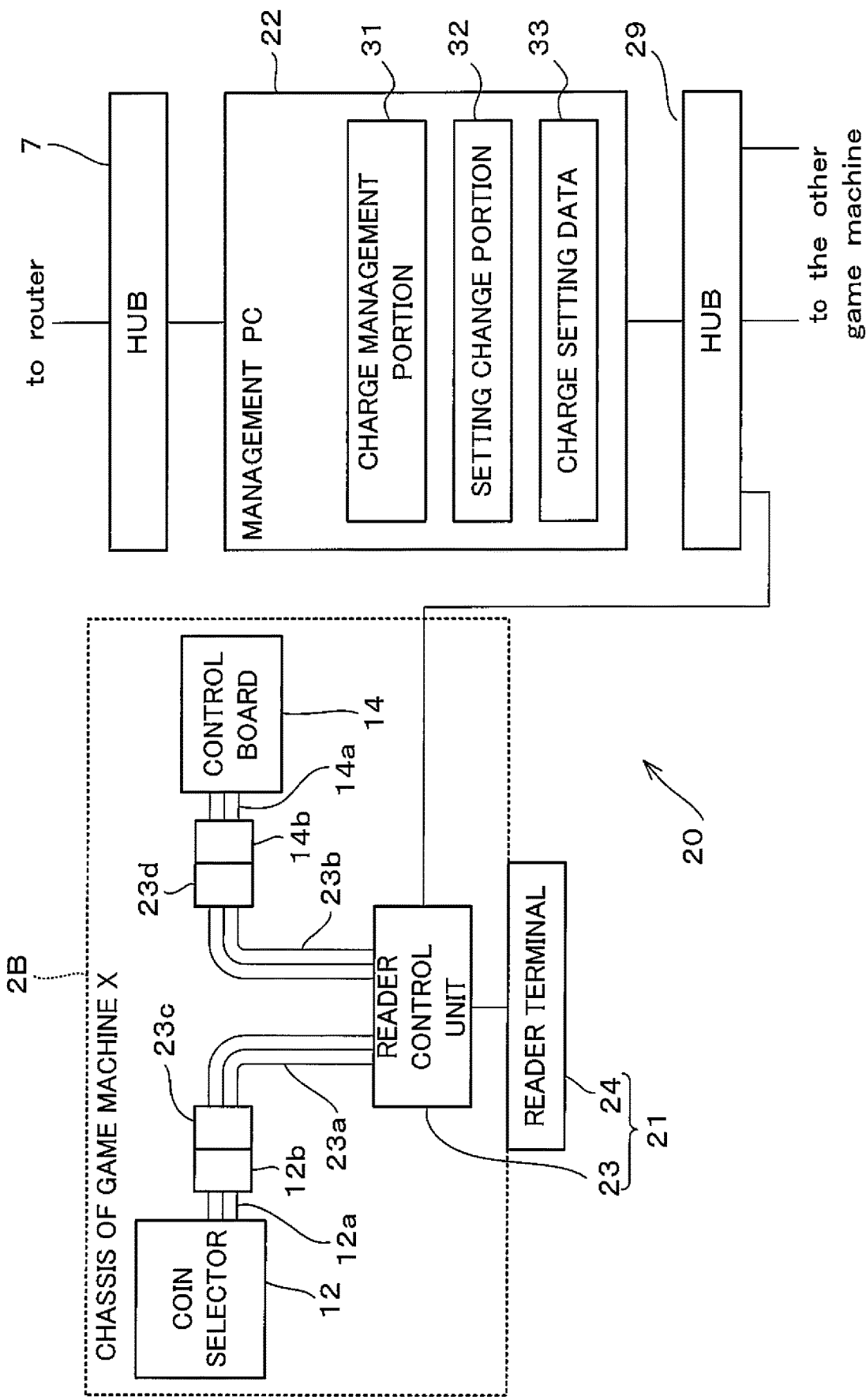
FIG. 2 is a diagram showing major part of the fee collection system.

FIG. 2 shows a major part of the fee collection system 20. The reader 21 comprises a reader control unit 23 and a reader terminal 24. Both of them are capable of attaching and detaching to a chassis of the second game machine 2B and is configured as a physical apparatus which can be installed to the second game machine 2B aftermarket. The reader control unit 23 and the reader terminal 24 are connected to each other, and the reader control unit 23 is connected to the management PC 22 via the hub 29.

The reader control unit 23 is a control unit obtained by combining a computer unit where a microprocessor and software are combined and a hardware circuit configured to implement processing depending on instructions from the computer unit. The reader control unit 23 is installed to the inside of a chassis of the second game machine 2B (hereinafter, sometimes referred to as the game machine chassis). From the reader control unit 23, a pair of connection cables 23a, 23b are pulled out. One connection cable 23a is connected to a connection cable 12a of a coin selector 12 installed in the second game machine 2B via couplers 12b, 23c. The other connection cable 23b is connected to a connection cable 14a pulled out from a control board 14 of the game machine 2B via couplers 14b, 23d. The coin selector 12 is a well-known unit which is provided for realizing the collection of game-play fee by cash (coins). That is, the coin selector 12 exists on a route for inputting coins of the second game machine 2B, and determines whether the coins inputted by the user are true or false. Then, the coin selector 12 outputs a pulse signal depending on the input value as the payment signal when the coins inputted are true ones, and when the coins are false ones, returns the coins. For example, in a case that one piece of coin is inputted, the coin corresponding to the minimum unit which the second game machine 2B can accept, one pulse is outputted from the coin selector 12.

The control board 14 is a substrate, where provided is a control circuit for controlling operations of the second game machine 2B and implementing a predetermined game. In the game machine provided on the premise of collecting a fee by cash, the connection cable 12a of the coin selector 12 and the connection cable 14a of the control board 14 are connected via the coupler 12b, 14b. Then, when the pulse signal corresponding to the game-play fee for one time of game-play is given to the control board 14 from the coin selector 12, the control circuit of the control board 14 determines that a predetermined game-play fee has been paid, and starts processing necessary for executing the game. In short, the coin selector 12 corresponds to a detection device of the charge objective apparatus, and the control board 14 corresponds to a use control device of the charge objective apparatus. In the fee collection system 20 of the present invention, the reader control unit 23 is provided so as to intervene between the coin selector 12 and the control board 14. When the pulse signal is provided from the coin selector 12 to the reader control unit 23 via the connection cable 12a, the reader control unit 23 makes the pulse signal pass through the connection cable 23b to the control board 14. Further, the reader control unit 23 supplies a power to the reader terminal 24 and control operations of the reader terminal 24. When receiving predetermined information from the reader terminal 24, the reader control unit 23 requests for predetermined processing to the management PC 22, and implements processing depending on the response of the management PC 22 corresponding to the request therefrom. As one example, when predetermined conditions are satisfied, the reader control unit 23 outputs the pulse signal of fee collection to the control board 14 in place of the pulse signal from the coin selector 12. When seen from the control board 14, the pulse signal from the reader control unit 23 is equivalent to the pulse signal from the coin selector 12. The processes implemented by the reader control unit 23 will be described later.

The reader terminal 24 is mounted to the outside of a chassis of the second game machine 2B, where the user can access the reader terminal 24. FIG. 3 shows one example of the reader terminal 24. The reader terminal 24 comprises a case 25 rectangular-shaped when seen from the front, touch-type operation keys 26 arranged in the front face of the case 25, a liquid crystal display (LCD) 27 arranged on the upper side of the operation keys 26, and a reading chip 28 provided in the inside of the case 25. In a case of using such reader terminal 24, it is necessary to mount the reader terminal 24 to the chassis of second game machine 2B so that the user can operate the operation keys 26 of the case 25 from the outside of the chassis of the second game machine 2B. For example, the reader terminal 24 may be mounted to the chassis in such a way that the front face of the reader terminal 24 is exposed in a control panel (not illustrated) of the chassis of the second game machine 2B.

The operation keys 26 are provided as a device for inputting numerals. The LCD 27 is provided as a display device for presenting information to the user. The reading chip 28 is provided as a device for accessing the IC chip of the card 11 and reading out the information (including the card ID) recorded in the IC chip. When the card 11 touches a reading position arranged in the front face of the reader terminal 24, the reading chip 28 detects this action and transmits to the reader control unit 23, the information read out from the card 11. The inside of the case 25 is provided with an interface circuit which mediates communications between each of the operation keys 26, the LCD 27 and the reading chip 28, and the reader control unit 23. However, the illustration of the interface circuit is omitted. By mounting the reader 21 to the second game machine 2B in the mentioned way, the hardware and software necessary for fee collection using electronic money are added to the second game machine 2B.

Returning to FIG. 2, the explanation will be continued. The management PC 22 is provided with a charge management portion 31 and a setting change portion 32 in order to realize a fee collection function using the account management server 4. Each of the charge management portion 31 and the setting change portion 32 is a logical device to be realized by the combination of hardware and software of the management PC 22. Further, charge setting data 33 is recorded in a storage device of the management PC 22. The charge setting data 33 is data, where written is the consumption amount of electronic money corresponding to the game-play fee per one game-play. The charge setting data 33 is prepared for each reader 21, and recorded in a state that each charge setting data 33 can be identified by using the reader ID. In other words, the charge setting data 33 is prepared in association on one-to-one with the second game machine 2B where the reader 21 is mounted.

FIG. 4 shows one example of the charge setting data 33. In this example, the number of times the game has been played and the consumption amount of electronic money are recorded in association with each other. For example, the consumption amount of electronic money is set as follows: 150 points (150P) for the first game-play; 120P for the second game-play; 90P for the third game-play; and 70P for each of the fourth and the subsequent game-plays. In the present embodiment, the number of times played is set as the number of repetitions that a user has repeated the game-play. For example, the first game-play means a case that the game is played firstly, and the second game-play means a case that the game is played repeatedly one time. It is possible to determine whether the same user plays the game repeatedly, by determining whether the card ID at the moment when processing for fee collection is requested to the management PC 22 is equal to a card ID of a prior request for processing. Additionally, the reader 21 outputs the pulse signal to the control board 14 in place of the coin selector 14, and the control board 14 does not transmit to the coin selector 12, information for determining the number of repetitions of game-play. Accordingly, the reader control unit 23 cannot obtain the information for determining the number of repetitions of game-play. Because of this, it is necessary to determine the number of times played by using the card ID obtained by the reader 21. The charge setting data 33 shown in FIG. 4 is set in such a way that the game-play fee is reduced gradually when the same user plays the game repeatedly. Besides that, the charge setting data 33 may be set appropriately in association with information obtained from the reader 21.

Returning to FIG. 2, the explanation will be continued. The charge management portion 31 accepts a request for process transmitted from the reader control unit 23, that is, a request for fee collection by electronic money, attempts to collect a fee by electronic money in cooperation with the account management server 4, and notifies the reader control unit 23 of the result of attempt. The procedure executed between the charge management portion 31 and the account management server 4 is the same as the procedure executed between the first game machine 2A and the account management server 4. Namely, when seen from the account management server 4, the management PC 22 is configured so as to behave like the part to realize the fee collection function of the first game machine 2A.

The setting change portion 32 is a logical device which makes a monitor of the management PC 22 display a predetermined setting image (an interface), and based on the instruction via an input device (such as a keyboard and a mouse) of the management PC 22, controls the charge setting data 33, that is, implements processing such as generation, change, and deletion of charge setting data 33. In the example shown in FIG. 4, it is possible for the setting change portion 32 to control the consumption amount of electronic money depending on the number of times played. For example, by using the function of the setting change portion 32, it is possible to change the charge setting data 33 such that the consumption amounts of the second and the subsequent game-play are reduced by a predetermined amount across the board, or the consumption amount of only the first game-play is reduced by a predetermined amount, and to control the charge setting data 33 by newly setting, changing, and adding conditions and the like of the game-play. Additionally, as the charge setting data 33 is basic data for setting a collection value of the game-play fee by electronic money, the control of the charge setting data 33 should not be permitted without restriction. Because of this, it is preferable to provide some security measures such that only an eligible person such as an administrator (an operator) of a store can control the charge setting data 33, by requiring for login processing when the charge setting data 33 is operated by the management PC 22. It is possible to control the charge setting data 33 for each reader ID independently.

Figure 5:
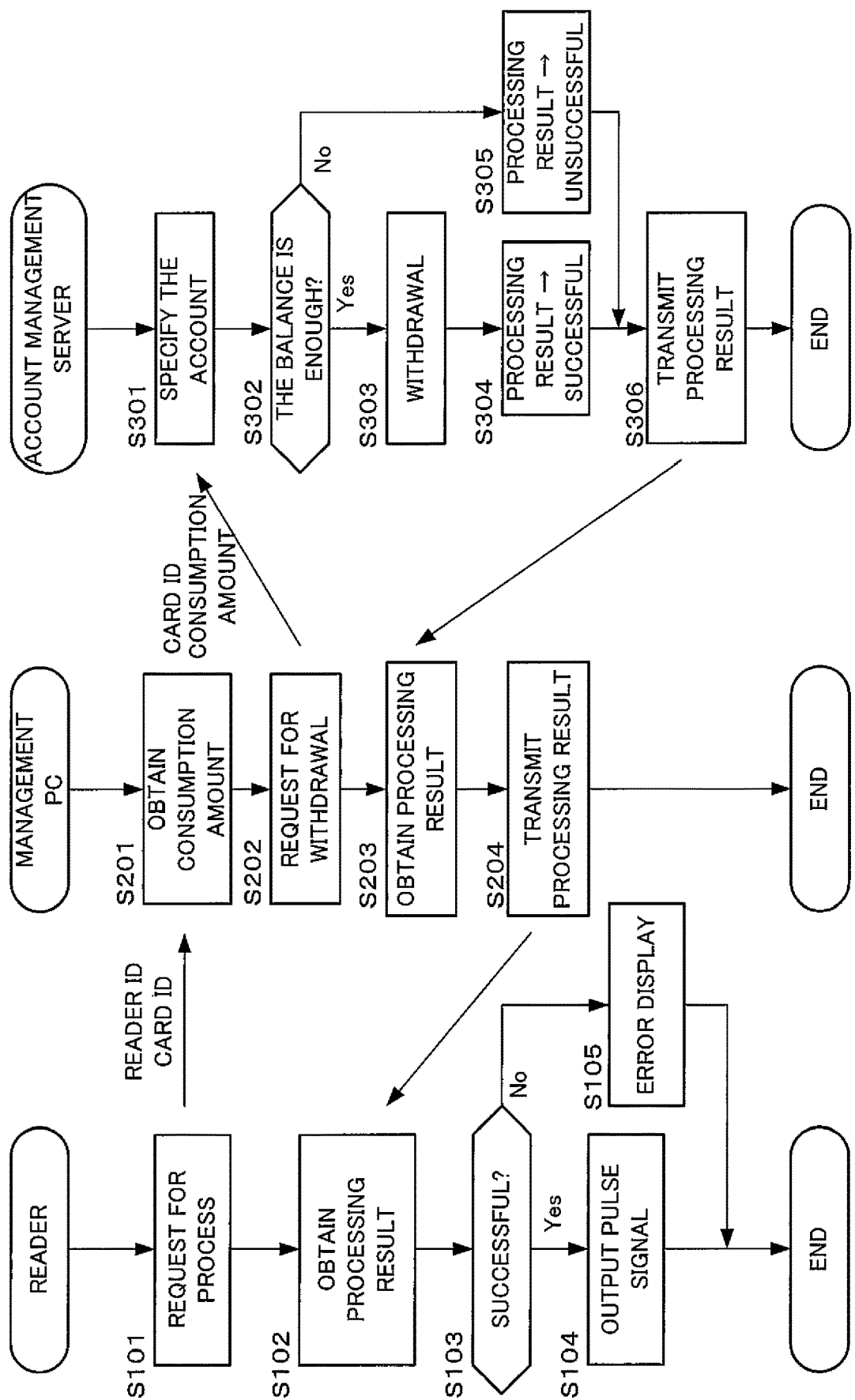
FIG. 5 is a flowchart showing processes at the moment of collecting a game-play fee.

Next, referring to FIG. 5, for collecting the game-play fee of the second game machine 2B by electronic money, the processes implemented by the reader 21 (the reader control unit 23), the management PC 22 (the charge management portion 31), and the account management server 4 will be described. First, when the user makes the card 11 touch to the reader terminal 24, the reading chip 28 of the reader terminal 24 accesses the IC chip of the card 11 to read out the card ID, and notifies the reader control unit 23 of the card ID. The reader control unit 23 starts a reader process shown in FIG. 5 when receiving the notice of the card ID. First, at step S101, the reader control unit 23 transmits to the management PC 22, information including the reader ID set to its own game machine and the card ID read out by the reader terminal 24 to request the management PC 22 for collection of the game-play fee. After that, the reader control unit 23 goes to step S102 to wait a notice of processing result from the management PC 22.

When the charge management portion 31 of the management PC 22 receives the request for process from the reader control unit 23, referring to the charge setting data 33, obtains the consumption amount of electronic money corresponding to a request for collection of this time. For example, in a case of referring to the charge setting data 33 shown in FIG. 4, the charge management portion 31 determines the number of times played by comparing, with respect to the same reader ID, the card ID included in a prior request to the card ID included in the request of this time, and obtains from the charge setting data 33 the consumption value correlated to the number of times determined. In a case that the charge setting data 33 includes some conditions for determining the consumption value, in place of or in addition to the number of times played, at step S201, it is determined whether the conditions are satisfied or not, and thereby the consumption amount is determined.

At subsequent step S202, the charge management portion 31 requests for the withdrawal of electronic money to the account management server 4. In the request, the card ID transmitted from the reader control unit 23 and the consumption amount obtained at step S201 are included. After that, the charge management portion 31 goes to step S203 to wait a notice of processing result to the request for withdrawal from the account management server 4.

When receiving the request for withdrawal from the management PC 22, the account management server 4, at step S301, specifies the account data of electronic money corresponding to the card ID. At subsequent step S302, the account management server 4 determines whether the existing balance is equal to the consumption amount or more in the account specified. In a case of the existing balance is, the account management server 4 goes to step S303 to set information indicating successful withdrawal in the processing result which should be transmitted to the management PC 22. On the other hand, at step S302, in a case that the existing balance is not equal to the consumption amount or more, the account management server 4 goes to step S304 to set the information indicating unsuccessful withdrawal in the processing result which should be transmitted to the management PC 22. After the process in step S303 or S304, the account management server 4 goes to step S305 to transmit the processing result generated in step S303 or S304 to the management PC 22 which requested for the withdrawal. After that, the account management server 4 ends the process for the request for withdrawal of this time.

When the processing result is transmitted from the account management server 4, the charge management portion 31 of the management PC 22 obtains the processing result at step S203, and at subsequent step S204, notifies the reader control unit 23 of the processing result, the reader control unit 23 having requested for the process of this time. Thereby, the charge management portion 31 of the management PC 22 ends the process for the request of this time.

When the processing result is transmitted from the management PC 22, the reader control unit 23 obtains the processing result at step S102, and at subsequent step S103, determines whether the processing result indicating successful withdrawal. When the processing result indicates successful withdrawal, the reader control unit 23 goes to step S104 to output to the control board 14 the pulse signal corresponding to the fee necessary for playing the game of the second game machine 2B (hereinafter, referred to as a unit game-play fee). The pulse signal of this time is equivalent to the pulse signal which the coin selector 12 outputs when detecting the input of true coins the value of which corresponds to the unit game-play fee. For example, in a case that the unit game-play fee is 200 JPY, and the coin selector 12 is set so as to output two pulses when 200 JPY of coins are inputted, the reader control unit 23 outputs the two pulses to the control board 14 at step S104. Thereby, the control board 14 determines that the pulse signal indicating the input of 200 JPY was outputted from the coin selector 12, and processing necessary for executing the game is started. On the other hand, at step S103, it is determined that the processing result is unsuccessful, the reader control unit 23 goes to step S105 to control the operation of the reader terminal 24 so that a predetermined error notice, that is, a notice to the user indicating that the collection of game-play fee by electronic money was unsuccessful is displayed on the LCD 27 of the reader terminal 24. After the process of step S104 or step S105, the reader control unit 23 ends the process shown in FIG. 5.

In the fee collection system 20 above mentioned, the reader terminal 24 corresponds to an information obtaining device, and the reader control unit 23 corresponds to an equivalent signal output device. The management PC 22, further concretely, the storage device provided to the management PC 22 corresponds to a charge setting data storage device. The charge management portion 31 of the management PC 22 functions as a consumption amount determination device by implementing the process of step S201 in FIG. 5, and functions as a collection implementation device by implementing the processes of steps S202 to S204 in FIG. 5. The setting change portion 32 of the management PC 22 functions as a charge setting data control device.

Figure 6:
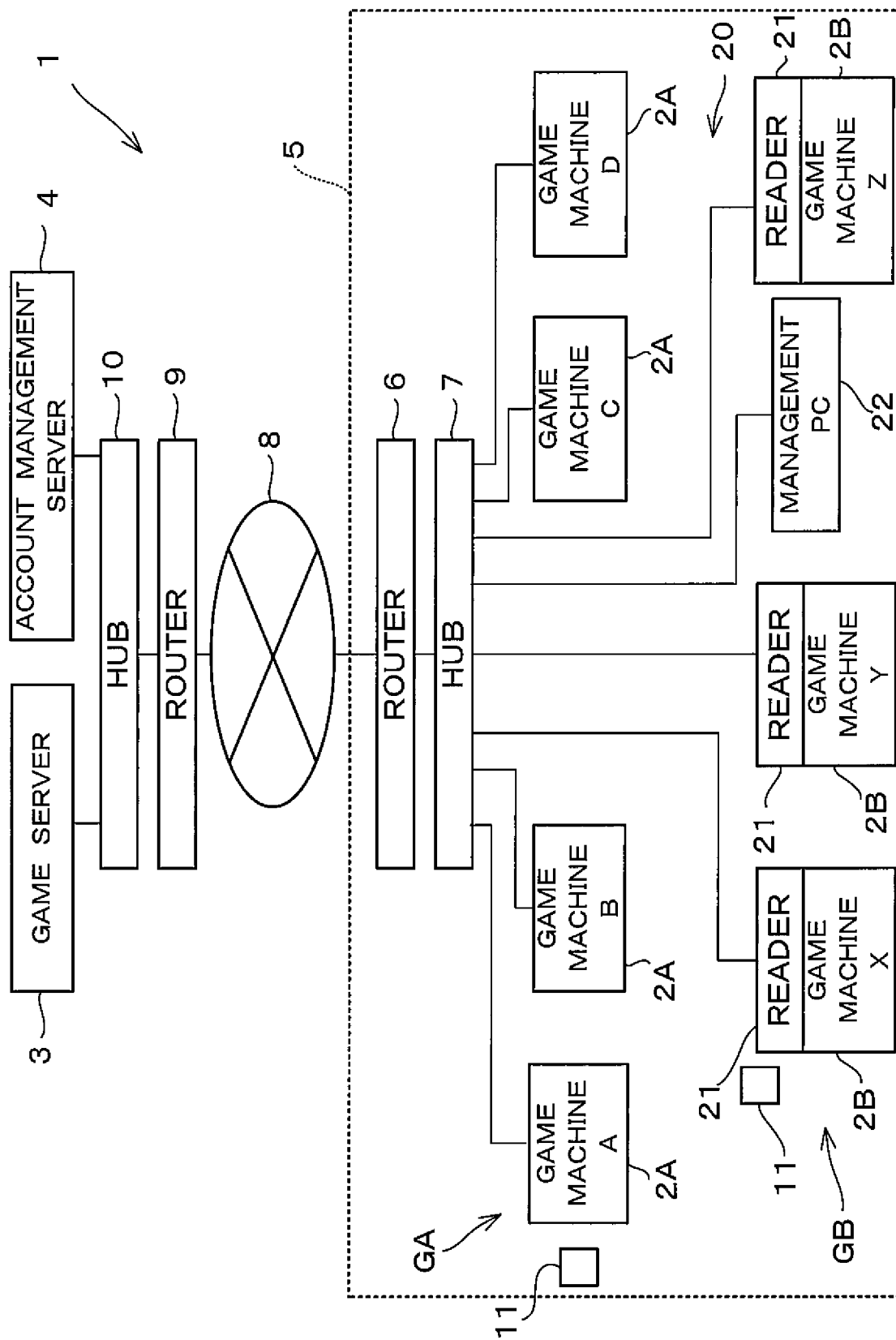
FIG. 6 is a diagram showing a variation of FIG. 1.
Figure 7:
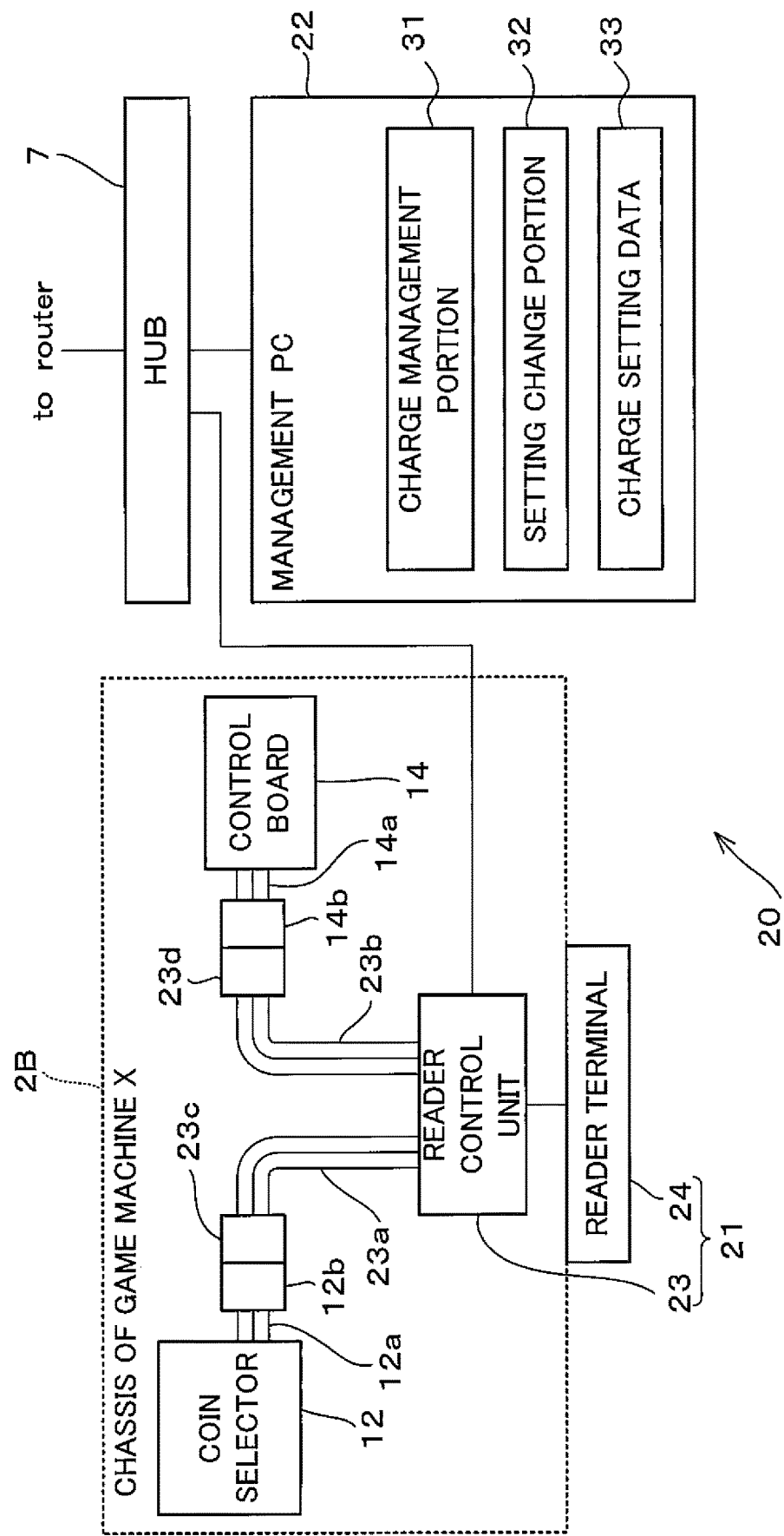
FIG. 7 is a diagram showing a variation of FIG. 2.

The present invention is not limited to the above mentioned embodiment, and various kinds of variations are available. For example, the embodiment of connection with respect to the reader 21 is not limited to the example shown in FIGS. 1 and 2. As shown in FIGS. 6 and 7, each reader 21 and the management PC 22 may be connected to the hub 7. Further, another hub may be connected additionally to the hub 7, and the other game machine may be connected to the hub. Alternatively, an another different game machine may be connected to the hub 29, or a further hub may be connected to the hub 29 and another different game machine may be connected to the hub.

The charge setting data 33 may be held by the reader control unit 23 in place of the management PC 22. In this case, the reader control unit 23 determines the consumption amount of electronic money, and notifies the charge management portion 31 of the management PC 22 of the consumption amount determined. The setting charge portion 32 accesses to the reader control unit 23 to control the charge setting data. The account of electronic money is not always held by the account management server connected via a wide area network (WAN) like the internet. For example, the account data of electronic money available only within a certain store may be held by a server provided to a store LAN of the store. Alternatively, the account data of electronic money may be held by the management PC itself. Even in a case that the amount of electronic money available for the user is held in the card 11, the present invention can be applied to the case. In this case, the charge management portion 31 of the management PC 22 may instruct the reader control unit 23 to consume the electronic money, that is, withdraw the consumption amount from the balance of electronic money held in the card 11. Alternatively, in a case that the charge setting data 33 is held by the reader control unit 23, the reader control unit 23 may be made function as the collection implementation device, by determining the consumption amount and implementing the withdrawal of the consumption amount from the card 11 via the reader terminal 24. In this way, according to the present invention, it is possible to provide each of the consumption amount determination device and the collection implementation device to the apparatus side unit or the management unit appropriately depending on a structure of collection of electronic money.

The mentioned embodiment is one example that the present invention is applied to so-called a prepaid type system that a user purchases electronic money in advance, and a consumption amount corresponding to a use fee is withdrawn from the amount purchased. However, the present invention is also applied to a postpaid type system. For example, in a case of the postpaid type, the management PC 22 transmits user identification information and the consumption amount to a server for totalizing the use amount of electronic money and charging later. Thereby, the collection implementation device can be realized.

Further, the reader terminal 24 obtains the card ID in response to a touch operation with the card 11 by the user in the above embodiment. However, the card ID may be obtained when the other operation is performed in addition to or in place of the touch operation. The information provided by a user is not limited to the card ID, and may be changed appropriately depending on the structure of collection of electronic money. The information the user should provide is not always recorded only in the card 11, but also the information may be inputted by the user using the input device such as the operation keys 26 of the reader terminal 24, or the information obtaining device may be configured so as to obtain necessary information from the user using various kinds of devices such as a bar code.

In the charge setting data 33 in FIG. 4, the consumption amount of electronic money is determined depending on the number of times played as a condition. However, the charge setting data of the present invention is not limited to such embodiment. The condition may be set in a range where at least either one of the apparatus side unit or the management unit can determine the condition. For example, the consumption amount may be designed in such a way that the number of times played with respect to the same user is counted by using the card ID, and depending on the counted value, the consumption amount set to the user is more reduced as the number of times played by the user is bigger. The consumption amount may be changed in a certain term or hours. In a case that the apparatus side unit or the management unit can recognize the balance of electronic money, the consumption amount may be designed so as to be changed depending on the balance.

The present invention is not always applied to an environment where both of the first game machine 2A and the second game machine 2B exist like the game system 1 shown in FIG. 1. It is not necessary that a plurality of charge objective apparatuses are provided, and the fee collection system of the present invention may be applied to only one independent charge objective apparatus. For example, in the above embodiment, the present invention can be applied to even a case that the first game machine 2A, or the first game machine group GA dose not exit, and only one second game machine 2B or only the second game machine group GB exists. The charge objective apparatus of the present invention is not limited to a game machine for business use, and the present invention may be applied to various kinds of charge objective apparatuses, as long as the charge objective apparatus comprises the detection device which detects payment of a fee and outputs the payment signal; and the use control device which implements a predetermined process for use in response to the payment signal.

What is claimed is:

1. A fee collection system applied to a gaming device comprising:
    a control board implementing a predetermined process in response to output of a payment signal, which is outputted from a coin selector, of a predetermined number of units corresponding to a use fee;
    a reader terminal that obtains, based on an operation by the user, information provided by the user for collection of the use fee by electronic money;
    a charge setting data storage device of a management device that stores charge setting data where a consumption amount of electronic money corresponding to the use fee is recorded in a changeable state;
    a charge management portion of the management device that determines the consumption amount of electronic money referring to the charge setting data and that implements a process necessary for collection of the consumption amount determined by the charge management portion of the management device;
    a reader control unit that outputs a payment equivalent signal equivalent to the payment signal when the collection of the consumption amount is successful; and
    a setting change portion of the management device that changes a value of the consumption amount of electronic money recorded in the charge setting data stored in the charge setting data storage device of the management device by following a predetermined setting operation for changing the value, wherein
    the control board implements the predetermined process for use in response to the payment equivalent signal outputted,
    the reader terminal and the reader control unit are mounted to the gaming device,
    the reader control unit outputs the payment equivalent signal of the predetermined number of the units corresponding to the use fee to the control board when the charge management portion of the management device successfully collects the consumption amount of the electronic money corresponding to the use fee, and
    the setting change portion of the management device is separated from the gaming device and connected to the reader terminal.

2. The fee collection system according to claim 1, wherein
    a plurality of consumption amounts are recorded in such a way that each of the consumption amounts is associated with a condition set in a range of determinable by using the information obtained by the reader terminal, and
    the charge management portion of the management device determines the consumption amount depending on a determination result of the condition when implementing fee collection by electronic money.

3. The fee collection system of claim 2, wherein
    the setting change portion of the management device is provided so as to change at least either one of the condition or the consumption amount.

4. The fee collection system of claim 1, wherein
    the management device is connected to an account management server via a predetermined network,
    the account management server holds account data where a balance of electronic money available for the user is recorded, and
    implements a withdrawal process, in response to a request for withdrawal transmitted from the management device, the request specifying identification information for specifying the account data and the consumption amount of electronic money, where the account management server attempts a withdrawal of the consumption amount from the account data corresponding to the identification information, and notifies the management device of an attempt result, the reader terminal obtains the identification information as the information provided by the user, and the charge management portion of the management device as the process necessary for collection of electronic money, transmits to the account management server the request for withdrawal specifying the information obtained by the reader terminal for specifying the account data and the consumption amount determined by the charge management portion of the management device, and provides the reader control unit with the attempt result transmitted from the account management server.

5. The fee collection system of claim 4, wherein each of a plurality of gaming devices is provided with the reader terminal, and the management device is provided so as to be shared by the reader terminals in a state that any one of the reader terminals of the plurality of gaming devices is specified as a communication partner.

6. The fee collection system of claim 5, wherein the charge setting data is provided for each of the reader terminals independently, and the setting change portion of the management device controls the charge setting data for each reader terminal independently.

7. The fee collection system of claim 1, wherein the coin selector detects the payment of the use fee by cash, and outputs the payment signal.

\* \* \* \* \*